United States Patent
Honda et al.

(10) Patent No.: US 7,724,802 B2
(45) Date of Patent: May 25, 2010

(54) RADAR APPARATUS

(75) Inventors: Kanako Honda, Hyogo (JP); Osamu Isaji, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 1282 days.

(21) Appl. No.: 10/947,446

(22) Filed: Sep. 23, 2004

(65) Prior Publication Data

US 2005/0083995 A1  Apr. 21, 2005

(30) Foreign Application Priority Data

Sep. 26, 2003  (JP) ............... P2003-335983

(51) Int. Cl.
H04B 1/707 (2006.01)
(52) U.S. Cl. .................. 375/130; 375/141
(58) Field of Classification Search .......... 375/130, 375/141
See application file for complete search history.

(56) References Cited

U.S. PATENT DOCUMENTS

| | | | | |
|---|---|---|---|---|
| 3,808,536 A | * | 4/1974 | Reynolds | 375/141 |
| 4,214,126 A | * | 7/1980 | Wipff | 380/252 |
| 5,113,192 A | * | 5/1992 | Thomas | 342/22 |
| 5,381,444 A | * | 1/1995 | Tajima | 375/141 |
| 5,680,137 A | * | 10/1997 | Ando et al. | 342/127 |
| 5,822,364 A | * | 10/1998 | Yamada et al. | 375/147 |
| 5,959,571 A | * | 9/1999 | Aoyagi et al. | 342/70 |
| 6,087,980 A | | 7/2000 | Saryo | |
| 2001/0035838 A1 | | 11/2001 | Soshi et al. | |

FOREIGN PATENT DOCUMENTS

| | | | |
|---|---|---|---|
| JP | 2001-168835 | * | 6/2001 |
| JP | A-2001-168763 | | 6/2001 |
| JP | A-2001-168835 | | 6/2001 |
| JP | A 2002-228745 | | 8/2002 |
| JP | A 2002-286855 | | 10/2002 |
| WO | WO 97/40400 | | 10/1997 |

* cited by examiner

*Primary Examiner*—Shuwang Liu
*Assistant Examiner*—Michael R Neff
(74) *Attorney, Agent, or Firm*—Oliff & Berridge, PLC (57) ABSTRACT

A radar apparatus includes a transmission section, a delay device, a reception section, a switch control section, a switching frequency detection section, and a relative distance calculation section. The transmission section transmits a signal wave, which is spectrum spread by using a spread code. The delay device gives delay to the spread code. The reception section receives a wave reflected by an object and spectrum despreads the reflected wave with using the delayed spread code to output a despread signal. The switch control section switches at a switching frequency an operation of at least one of the transmission section, the reception section, and the delay device. The switching frequency detection section detects the switching frequency from the despread signal. The relative distance calculation section calculates a distance to the object based on a detection result provided by the switching frequency detection section and an amount of the delay.

22 Claims, 12 Drawing Sheets

RADAR APPARATUS

BACKGROUND OF THE INVENTION

1. Field of the Invention

The present invention relates to a radar apparatus, which transmits a signal wave that is spectrum-spread by using a spread code, despreads a reflected wave by using the delayed spread code, and calculates a distance from an amount of the delay, and particularly relates to a radar apparatus, which outputs alternating current signals with a simple configuration.

2. Description of the Related Art

In the past, various radar apparatuses have been widely used for detection of an object and measurement of a distance. For example, JP-A-2002-286855 discloses a radar apparatus, which measures presence or absence of, and a distance to an object exiting at a short distance such as in the ground. In this radar apparatus, a detection depth is extended without lowering a resolution, by disposing switch circuits for shutting-off/attenuating a signal path at a front end of a transmission antenna and a rear end of a reception antenna.

Also, U.S. Pat. No. 6,087,980 discloses a radar apparatus, which utilizes a single antenna by switching it at the time of transmission and at the time of reception. Thereby, U.S. Pat. No. 6,087,980 realizes preventing a noise component from wrapping around between a transmission side and a reception side, and cost reduction.

Further, US2001/035838A discloses a radar apparatus, which removes a low frequency component generated at the time of frequency modulation of a transmission signal, by use of a filter and a switch, and realizes high accuracy demodulation, which is not influenced by output fluctuation of the transmission signal.

Also, JP-A-2002-228745 discloses a radar apparatus, which switches a plurality of reception side paths with using a switch and stops the switching during such a period that there is no necessity to process a reception signal, and reduces electric power consumption and a heat release amount.

SUMMARY OF THE INVENTION

As one of these radar systems, there is a spread spectrum radar. In this spread spectrum radar, a signal wave is spectrum-spread by using a spread code, and a frequency band to be used is expanded. In this manner, by expanding a frequency band to be used, it is possible to commonly use a band, and utilize it effectively.

When the spread spectrum radar detects a reflected wave, a detection signal is obtained as a direct current signal (DC signal). However, it is difficult to amplify the direct current signal. Also, a direct current component is input to a rear stage circuit, and therefore, it is difficult to separate a signal and noise.

Then, there has been proposed a method for converting the detection signal into an alternating current component by giving a data signal to a spread code. However, in order to obtain a distance resolution, the spread code becomes very high frequency. Therefore, in this method, a mechanism for generating the spread code becomes complex, and a memory with large capacity becomes necessary in its inside.

Further, in this method, when a Doppler signal is detected, a bandwidth of a filter circuit at a rear stage has to be taken widely. However, this results in lowering of S/N.

That is, in a conventional spread spectrum radar, there has been such a problem that a complex circuit configuration is required to change a detection signal in to AC. In this regard, realization of a spread spectrum radar apparatus, which outputs alternating current signals with a simple configuration, is an important subject.

The invention is made to solve the problem as set forth above, and provides a spread spectrum radar, which outputs alternating current signals with a simple configuration.

In order to solve the above-described problem and to accomplish the object, a radar apparatus according to a first aspect of the invention includes a transmission section, a delay device, a reception section, a switch control section, a switching frequency detection section, and a relative distance calculation section. The transmission section transmits a signal wave, which is spectrum spread with using a spread code. The delay device gives delay to the spread code. The reception section receives the transmission wave reflected by an object and spectrum despreads the reflected wave with using the delayed spread code to output a despread signal. The switch control section switches at a switching frequency an operation of at least one of the transmission section, the reception section, and the delay device. The switching frequency detection section detects the switching frequency from the despread signal. The relative distance calculation section calculates a distance between the radar apparatus and the object based on a detection result provided by the switching frequency detection section and an amount of the delay given by the delay device.

According to a second aspect of the invention, in the first aspect, at least one of the transmission section and the reception section includes a switch. The switch control section switches the switch at the switching frequency.

According to a third aspect of the invention, in the first aspect, at least one of the transmission section and the reception section includes an amplifier for amplifying at least one of the transmission wave and the reflected wave. The switch control section switches gain of the amplifier at the switching frequency.

According to a fourth aspect of the invention, in the first aspect, the transmission section includes a spread section that spectrum spreads the transmission wave with using the spread code. The switch control section switches an operation of the spread section at the switching frequency.

According to a fifth aspect of the invention, in the first aspect, the reception section includes a despread section that spectrum despreads the reflected wave with using the delayed spread code. The switch control section switches an operation of the despread section at the switching frequency.

According to a sixth aspect of the invention, in the first aspect, the switching frequency is higher than a Doppler frequency, which is generated in the reflected wave when the object has a relative speed to the radar apparatus.

According to a seventh aspect of the invention, the radar apparatus of the first aspect further includes a saturation amplifier that amplifies the despread signal so that the amplified despread signal saturates, to output a binary signal.

According to an eight aspect of the invention, in the seventh aspect, the saturation amplifier includes a variable amplifier that amplifies the despread signal at a gain corresponding to the amount of the delay.

According to a ninth aspect of the invention, the radar apparatus of the first aspect further includes a Doppler frequency detection section that detects a Doppler frequency from the despread signal while the switch control section stops switching.

According to a tenth aspect of the invention, in the first aspect, the switch control section controls the delay device to switch the amount of the delay.

According to an eleventh aspect of the invention, in the tenth aspect, the switch control section changes the switching frequency in accordance with the amount of the delay.

According to a twelfth aspect of the invention, in the tenth aspect, when the delay device switches the amount of the delay, the switch control section controls the delay device so that the amount of the delay corresponds to a frequency of switching to the amount of the delay.

Each of the first to sixth and tenth aspects of the invention provides a spread spectrum radar apparatus that outputs an alternating current signal with a simple configuration.

The seventh aspect of the invention provides a spread spectrum radar apparatus that outputs a digital signal with a simple configuration and without using an analogue/digital converter.

The eighth aspect of the invention provides a spread spectrum radar apparatus that outputs an alternating current signal accurately with a simple configuration.

The ninth aspect of the invention provides a spread spectrum radar apparatus that calculates a relative distance and a relative speed and outputs them as an alternating current signal with a simple configuration.

The eleventh aspect of the invention provides a spread spectrum radar apparatus that can calculate the relative distance easily.

The twelfth aspect of the invention provides a spread spectrum radar apparatus that can set priority order with respect to distances to be detected.

DETAILED DESCRIPTION OF THE PREFERRED EMBODIMENT

Hereinafter, with reference to accompanying drawings, a radar apparatus according to a preferred embodiment of the invention will be described.

Embodiments

Figure 1:
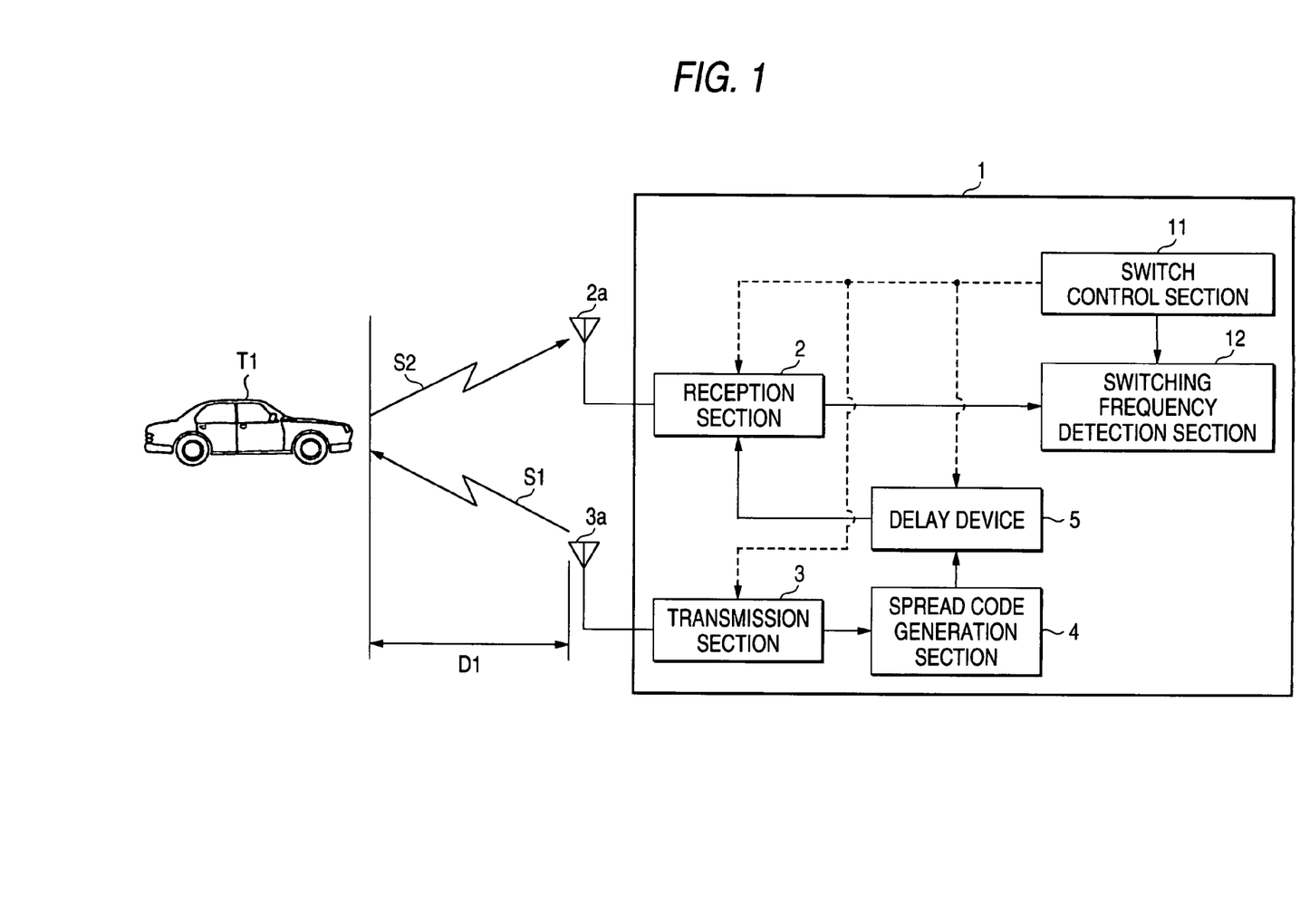
FIG. 1 is an explanatory diagram showing an outline of an embodiment of the invention.

Firstly, with reference to FIG. 1, an outline of the embodiment will be described. A radar apparatus 1 shown in FIG. 1 is a spread spectrum radar apparatus. A spread code generation section 4 generates a spread code. The transmission section 3 transmits a spread spectrum transmission wave S1 through an antenna 3a.

After that, the transmission wave S1 is reflected by a measurement target T1, and received as a reflected wave S2 by an antenna 2a. Meanwhile, here, it is assumed that the radar apparatus 1 is an in-vehicle radar apparatus, which is mounted in a vehicle, and that the measurement target is another vehicle or obstacle, which exists therearound.

A delay device 5 of the radar apparatus 1 gives delay to the spread code generated by the spread code generation section 4, and supplies the delayed spread code to a reception section 2 as a despread code. The reception section 2 despreads the reflected wave S2 received by the antenna 2a, by using a despread code.

As a result, if a delay amount of the despread code corresponds to a distance D1 between the radar apparatus 1 and the measurement target T1, the reception section 2 outputs a detection signal. In other words, the delay amount of the despread code at the time when the reception section 2 outputs the detection signal indicates a distance between the radar apparatus 1 and the measurement target T1.

Here, the detection signal is normally obtained as a DC signal. In this regard, in the radar apparatus 1 according to the embodiment of the invention, a switch control section 11 switching-controls the reception section 2, the transmission section 3, and/or the delay device 5 at a predetermined frequency. As a result, the detection signal has an alternating current component at the switching frequency. Since a switching frequency detection section 12 detects the switching frequency of the detection signal, it is possible to treat the detection signal as an AC signal.

Figure 2:
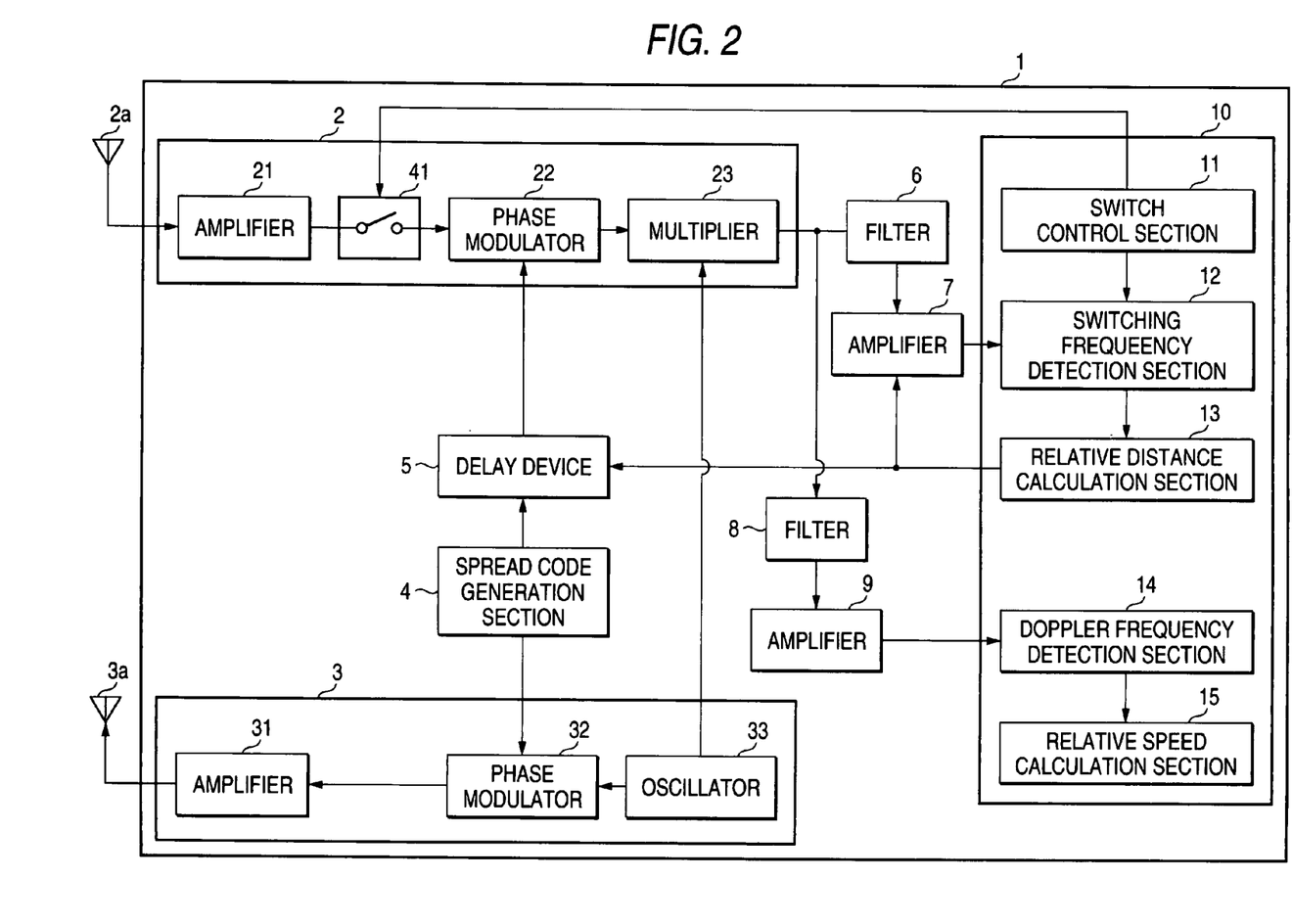
FIG. 2 is a schematic block diagram showing a schematic configuration of a radar apparatus according to the embodiment.

Next, a specific configuration example of the radar apparatus 1 will be described. FIG. 2 is a schematic block diagram showing a schematic configuration of the radar apparatus 1 according to the embodiment. As shown in FIG. 2, the radar apparatus 1 includes, in its inside, the reception section 2, the transmission section 3, the spread code generation section 4, the delay device 5, filters 6,8, amplifiers 7, 9 and a microcomputer 10.

Also, the transmission section 3 includes, in its inside, an amplifier 31, a phase modulator 32, and an oscillator 33. The spread code generation section 4 generates a PN (Pseudo Noise) code as the spread code, and supplies the spread code to the phase modulator 32. On the other hand, the oscillator 33 generates a predetermined high frequency signal and supplies it to the phase modulator 32.

The phase modulator 32 applies phase modulation to the high frequency signal generated by the oscillator 33, by using the spread code supplied from the spread code generation section 4, and outputs the modulated signal as a transmission wave to the amplifier 31. That is, the phase modulator 32 functions as a spread processing section.

The amplifier 31 amplifies the transmission wave output by the phase modulator 32 and transmits the amplified transmission wave through the antenna 3a. If an output power of the phase modulator 32 is sufficiently large, the amplifier 31 may not be provided.

The reception section 4 includes, in its inside, an amplifier 21, a switch 41, a phase modulator 22, and a multiplier 23. The amplifier 21 amplifies the reflected wave received by the antenna 2a, and outputs the amplified reflected wave to the switch 41. If intensity of the reflected wave is sufficiently large, the amplifier 21 may not be provided.

The switch 41 is a high-frequency switch that connects/disconnects a reception path at a switching frequency designated by the switch control section 11 of the microcomputer 10. Therefore, an output of the switch 41 has an AC component corresponding to the switching frequency, and is supplied to the phase modulator 22. It is noted that it is not necessary to dispose the switch 41 between the amplifier 21 and the phase modulator 22. The switch 41 may be disposed, for example, between the antenna 2a and the amplifier 21.

The phase modulator 22 applies phase modulation to a reception signal supplied from the switch 41, by using a despread code. Here, the despread code is such a code that the delay device 5 has given delay to the spread code output by the spread code generation section 4.

When the delay given to the despread code equals to delay until the transmission wave is received as the reflected wave, an original signal wave, i.e., a wave form generated by the oscillator 33 is taken out by the phase modulation. On the other hand, when the reflected wave does not exist or when the delay given to the despread code is different from the delay until the transmission wave is received as the reflected wave, it is impossible to take out the original wave form by the phase modulation.

In this regard, by giving arbitrary delay to the spread code, it is possible to know presence or absence of an object at a distance corresponding to that delay. Further, by switching a delay amount and searching delay with which an original wave form can be taken out, it is possible to measure a distance to the target. That is, the phase modulator 22 functions as a despread processing section.

Meanwhile, in this radar apparatus 1, the switch 41 gives an AC component corresponding to the switching frequency. Therefore, an output of the phase modulator 22 is a wave form in which the switching frequency is added to the wave form generated by the oscillator 33.

An output of the phase modulator 22 is supplied to the multiplier 23. Also, the original signal wave form is supplied from the oscillator 33 to the multiplier 23. The multiplier 23 multiplies the output of the phase modulator 22 and the output of the oscillator 33, and thereafter, outputs the multiple result to the filter 6 and the filter 8.

The filter 6 is a band pass filter through which the switching frequency of the switch control section 11 passes. The filter 6 filters the output of the multiplier 23, and thereafter, outputs the filtered output to the amplifier 7. The amplifier 7 amplifies the output of the filter 6, and supplies the amplified output to the microcomputer 10.

On the other hand, the filter 8 is a band pass filter through which Doppler frequency to be detected passes. The filter 8 filters the output from the multiplier 23, and thereafter, outputs the filtered output to the amplifier 9. The amplifier 9 amplifies the output of the filter 8, and supplies the amplified output to the microcomputer 10.

The microcomputer 10 includes, in its inside, the switch control section 11, a switching frequency detection section 12, a relative distance calculation section 13, a Doppler frequency detection section 14, and a relative speed calculation section 15.

The switch control section 11 generates the switching frequency, which designates timing of ON/OFF of the switch 41, and outputs the switching frequency to the switch 41 and the switching frequency detection section 12.

Here, the switching frequency is set at sufficiently high frequency against Doppler frequency to be estimated. This is because, when the switching frequency and the Doppler frequency become identical in the case where a measurement target has relative speed, it becomes impossible to judge either a frequency component of the detection signal is resulted from the switching or the Doppler effect.

The switching frequency detection section 12 receives the switching frequency from the switch control section 11, and detects, from the output of the amplifier 7, a frequency component having the same frequency as the switching frequency, and outputs a detection result to the relative distance calculation section 13.

The relative distance calculation section 13 obtains the detection result from the switching frequency detection section 12. Also, the relative distance calculation section 13 controls the delay amount of the delay device 5 and a gain of the amplifier 7. Specifically, the relative distance calculation section 13 sets the delay amount of the delay device 5, and as a result of the setting, if the switching frequency detection section 12 detects a switching frequency component from the detection signal, the relative distance calculation section 13 judges that an object exists at a distance corresponding to the set delay amount.

Also, the relative distance calculation section 13 controls the gain of the amplifier 7 in conjunction with the delay amount. More specifically, when the delay amount is small, i.e., when a measurement target exists at a short distance, intensity of the reflected wave is large. Therefore, the relative distance calculation section 13 sets the gain of the amplifier 7 small. On the other hand, when the delay amount is large, i.e., when the measurement target exists at a long distance, intensity of the reflected wave is small. Therefore, the relative distance calculation section 13 sets the gain of the amplifier 7 large.

Further, in case of setting the gain of the amplifier 7, the relative distance calculation section 13 sets the gain so that the amplified signal wave form is saturated. By saturating the signal wave form in this manner, it becomes possible to make the detection signal be a binary signal. Therefore, it is possible to directly input the detection signal to a digital signal processor (here, the microcomputer 10).

Therefore, the gain of the amplifier 7 is set so that a signal with a desired reception intensity is amplified up to a maximum value (saturation value) of the output of the amplifier 7 and that the maximum value becomes a High level of the digital processing at a subsequent stage. By setting in this manner, a signal with the predetermined reception intensity or more is treated as the Hi level in the digital processing at the subsequent stage.

That is, the amplifier 7 may be a variable amplifier, and functions as a saturated amplification section. As a result, it is possible to input the detection signal into the digital signal processor without disposing an analog/digital converter.

In the case where an object, which is a measurement target, has relative speed to the radar apparatus 1, frequency due to the Doppler phenomenon is applied to the detection signal. The Doppler frequency detection section 14 detects the Doppler frequency from the output of the amplifier 9, and outputs the detected Doppler frequency to the relative speed calculation section 15. The relative speed calculation section 15 calculates relative speed of the target from a value of the Doppler frequency.

Here, in order to detect the Doppler frequency and to calculate the relative speed, it is necessary to remove a frequency component resulted from the switching of the switch 41. In this regard, in case of detecting the Doppler frequency, the switch control section 11 makes the switch 41 be always in a connected state, to prevent the switching frequency from being added to the detection signal.

Next, an operation procedure of the radar apparatus 1 will be described. Firstly, the switch control section 11 in the microcomputer 10 determines the switching frequency, and outputs the switching frequency to the switch 41 and the switching frequency detection section 12. Also, the relative speed calculation section 13 sets the delay amount and the gain of the amplifier 7.

If an object exists at a distance, which is comparable to the set delay amount, and intensity of the reflected wave, which has been reflected on that object, is a predetermined value or more, a signal with the same frequency as the switching frequency is input from the amplifier 7 to the microcomputer 10. The microcomputer 10 detects presence or absence of this signal to judge whether or not an object exists at a distance corresponding to the set delay amount.

On the other hand, in case of measuring relative speed of a target, the switch control section 11 stops switching, and the microcomputer 10 detects the signal input from the amplifier 9 and measures frequency of the input signal. Thereby, it is possible to measure the relative speed of the target.

In this manner, in the radar apparatus 1, the switch control section 11 controls the switch 41 on the basis of the set switching frequency to connect/disconnect the reception path. As a result, the detection signal has an alternating current component at the switching frequency. The switching frequency detection section 12 detects the switching frequency in the detection signal, and thereby, it is possible to treat the detection signal as an AC signal.

In the meantime, a method for adding the switching frequency to the detection signal is not limited to such a matter that the switch 41 is disposed in the reception path. Hereinafter, variation of a configuration for adding the switching frequency to the detection signal will be exemplified.

Figure 3:
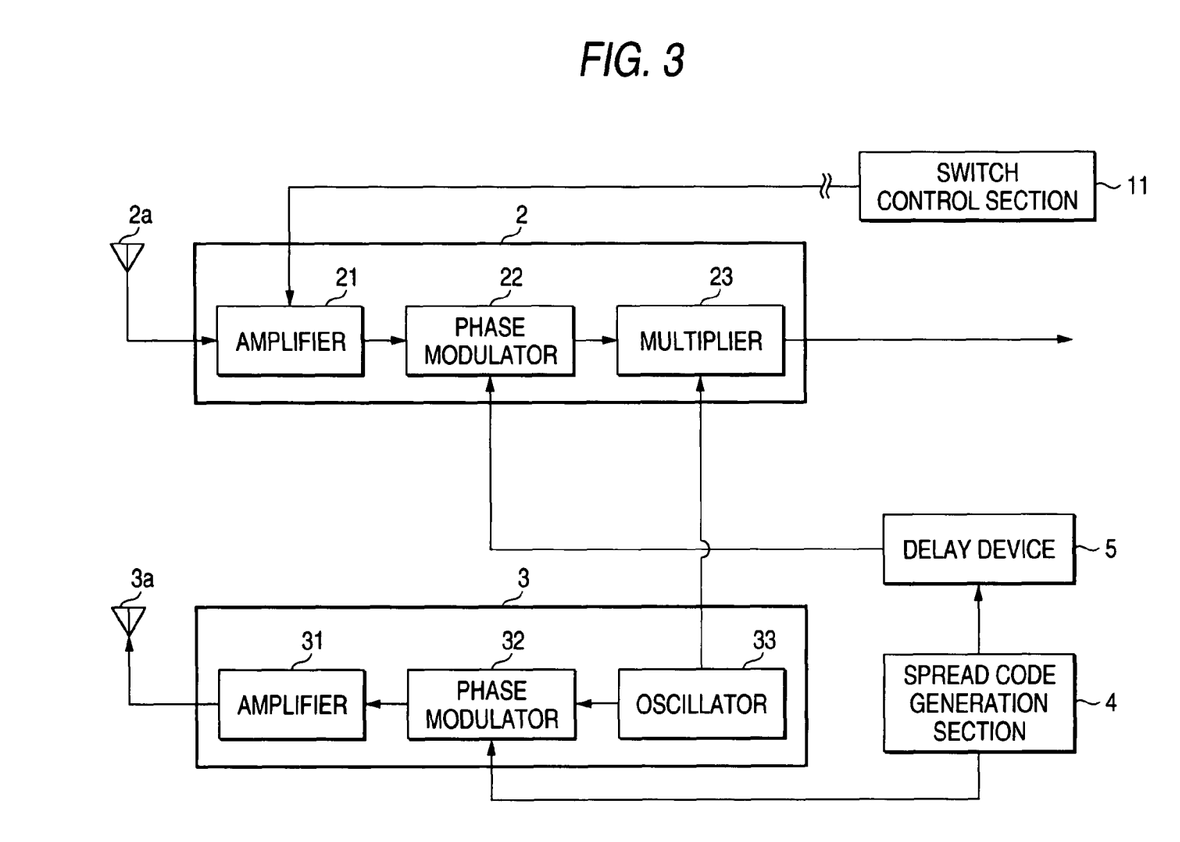
FIG. 3 is an explanatory diagram explaining a configuration for adding a switching frequency to a detection signal by switching a gain of a reflected wave.

FIG. 3 is an explanatory diagram explaining a configuration for adding the switching frequency to the detection signal by changing the gain of the reflected wave. As shown in FIG. 3, an amplifier 21a of the reception section 2 receives control of the switch control section 11, and amplifies the reflected wave at a frequency corresponding to the switching frequency.

Changing the operation of the amplifier in the reception section 2 in this manner can add the switching frequency to the detection signal as with the radar apparatus 1 shown in FIG. 2. It is noted that in case of changing the operation of the amplifier 21a, a variable amplifier may be used to change the gain or operation/non-operation of the amplifier 21a may be switched.

Figure 4:
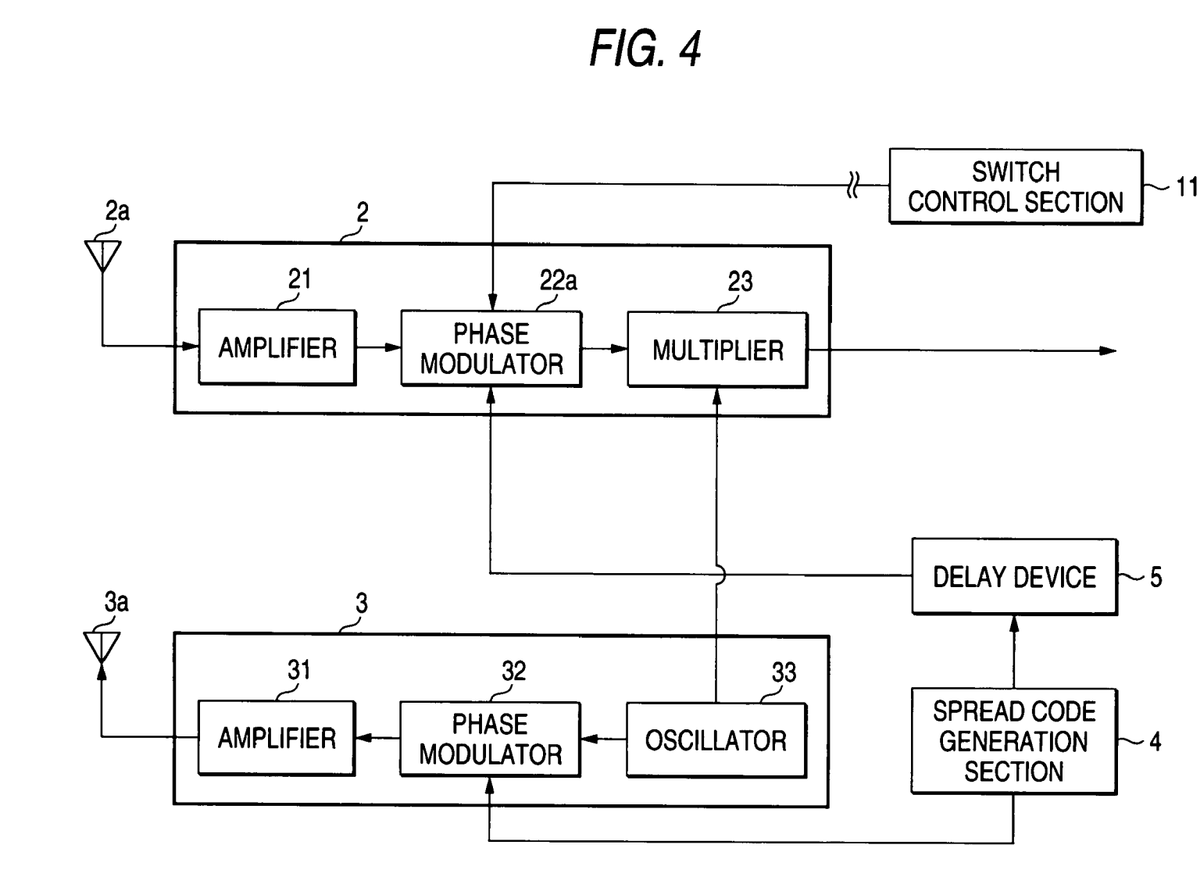
FIG. 4 is an explanatory diagram explaining a configuration for adding the switching frequency to the detection signal by switching an operation of a phase modulator on a reception side.

In the same manner, FIG. 4 is an explanatory diagram explaining a configuration for adding the switching frequency to the detection signal by changing an operation of a phase modulator at a reception side. As shown in FIG. 4, a phase modulator 22a of the reception section 2 receives control of the switch control section 11 to switch operation/non-operation in accordance with the switching frequency. Switching the operation of the phase modulator 22a in the reception section 2 can also add the switching frequency to the detection signal as with the radar apparatus 1 shown in FIG. 2.

Figure 5:
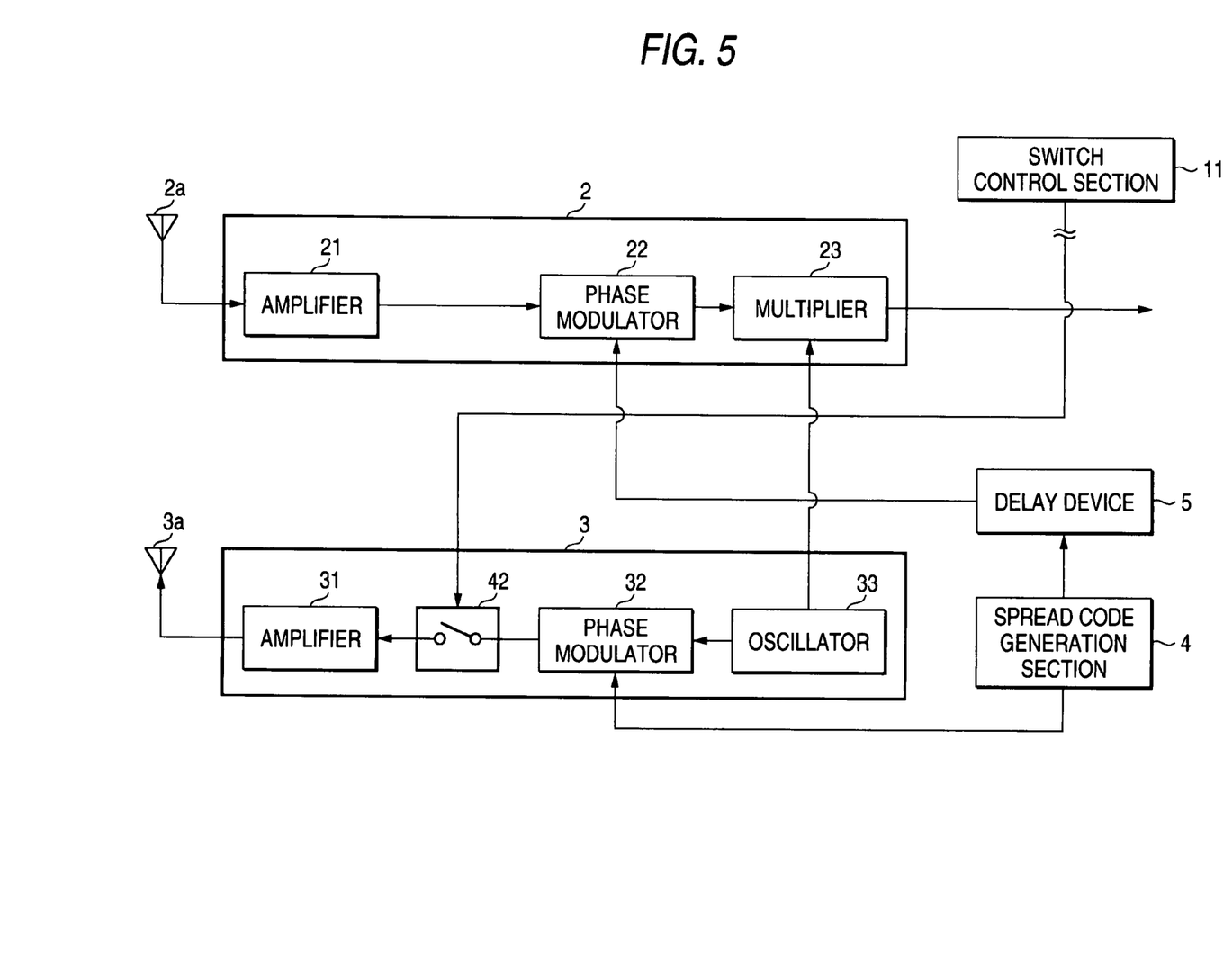
FIG. 5 is an explanatory diagram explaining a configuration, in which a switch is disposed on a transmission path, for connecting/disconnecting the transmission path.

Also, FIG. 5 is an explanatory diagram explaining a configuration for disposing a switch on a transmission path and for connecting/disconnecting the transmission path on the basis of the switching frequency set by the switch control section 11. As shown in FIG. 5, a switch 42 is disposed between the amplifier 31 and the phase modulator 32 of the transmission section 3. By switching the switch 42, it is possible to select connection/disconnection of the transmission path.

Therefore, when the switch 41 is switched on the basis of the switching frequency set by the switch control section 11, the switching frequency is added to the transmission wave. Even in the case where the transmission path is connected/disconnected in this manner and the switching frequency is added to the transmission wave, it is possible to detect the switching frequency from the detection signal in the same manner as the radar apparatus 1 shown in FIG. 2.

It is noted that it is not necessary to dispose the switch 42 between the phase modulator 32 and the amplifier 31 and that the switch 42 may be disposed at an arbitrary place so long as the switch can switch a connection state of the transmission path. For example, the switch 42 may be disposed between the amplifier 31 and the antenna 3a.

Figure 6:
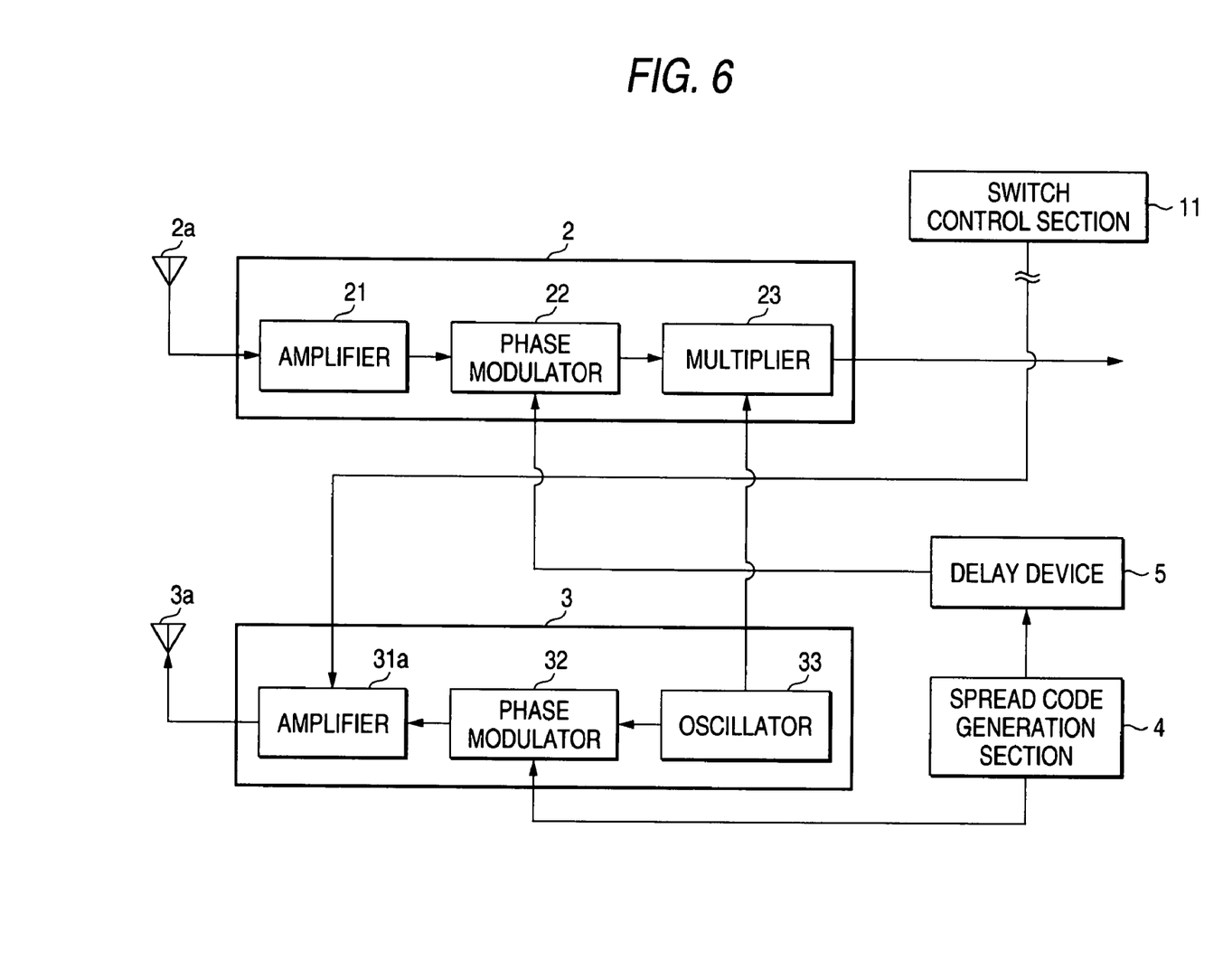
FIG. 6 is an explanatory diagram explaining a configuration for adding the switching frequency to the detection signal by switching a gain of a transmission wave.

Also, FIG. 6 is an explanatory diagram explaining a configuration for adding the switching frequency to the detection signal by switching the gain of the amplifier. As shown in FIG. 6, an amplifier 31a of the transmission section 3 receives control of the switch control section 11, and amplifies the transmission wave at a frequency corresponding to the switching frequency.

Changing an operation of the amplifier 31a in the transmission section 3 can also add the switching frequency to the detection signal as with the radar apparatus 1 shown in FIG. 2. It is noted that in case of changing the operation of the amplifier 31a, a variable amplifier may be used to change the gain or operation/non-operation of the amplifier 31a may be switched.

Figure 7:
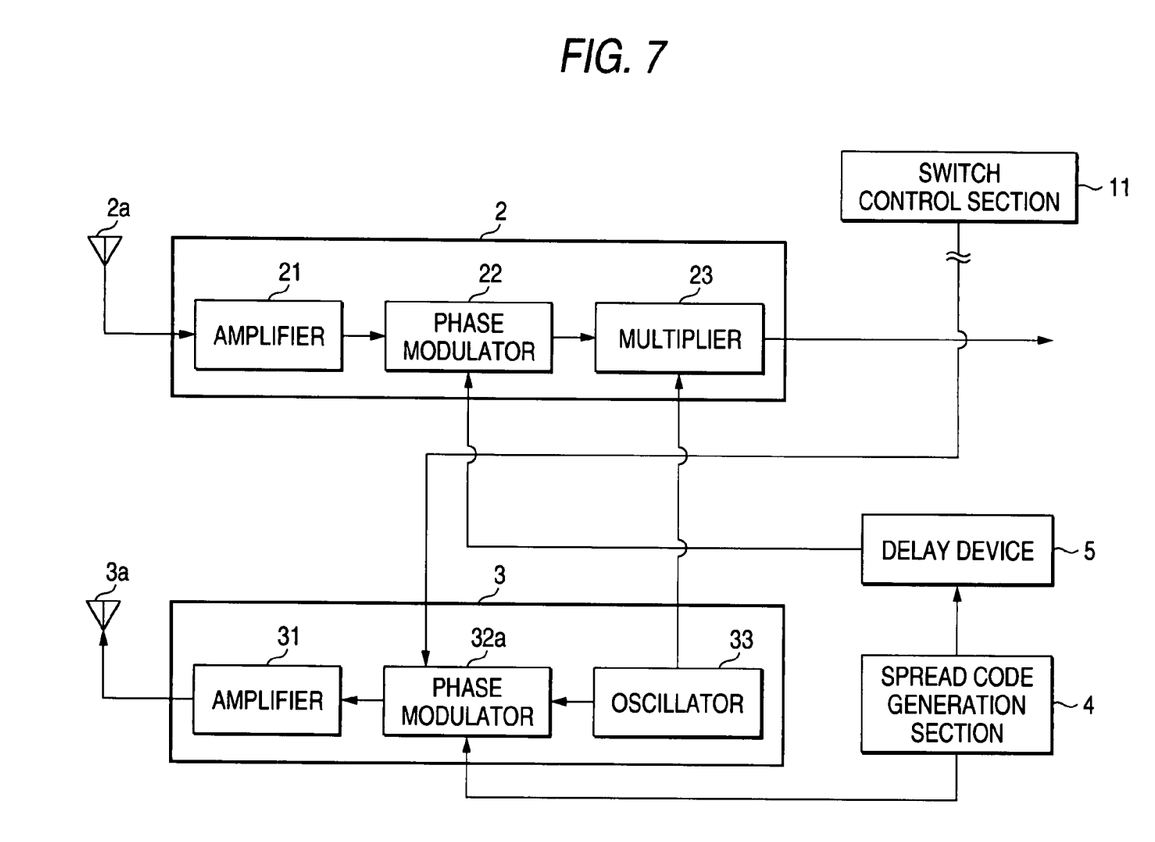
FIG. 7 is an explanatory diagram explaining a configuration for adding the switching frequency to the detection signal by switching an operation of a phase modulator on a transmission side.

Similarly, FIG. 7 is an explanatory diagram explaining a configuration for adding the switching frequency to the detection signal by switching an operation of a phase modulator at a transmission side. As shown in FIG. 7, a phase modulator 32a of the transmission section 3 receives control of the switch control section 11 and switches operation/non-operation in accordance with the switching frequency. Changing an operation of the phase modulator 32a in the transmission section 3 can also add the switching frequency to the detection signal as with the radar apparatus 1 shown in FIG. 2.

Figure 8:
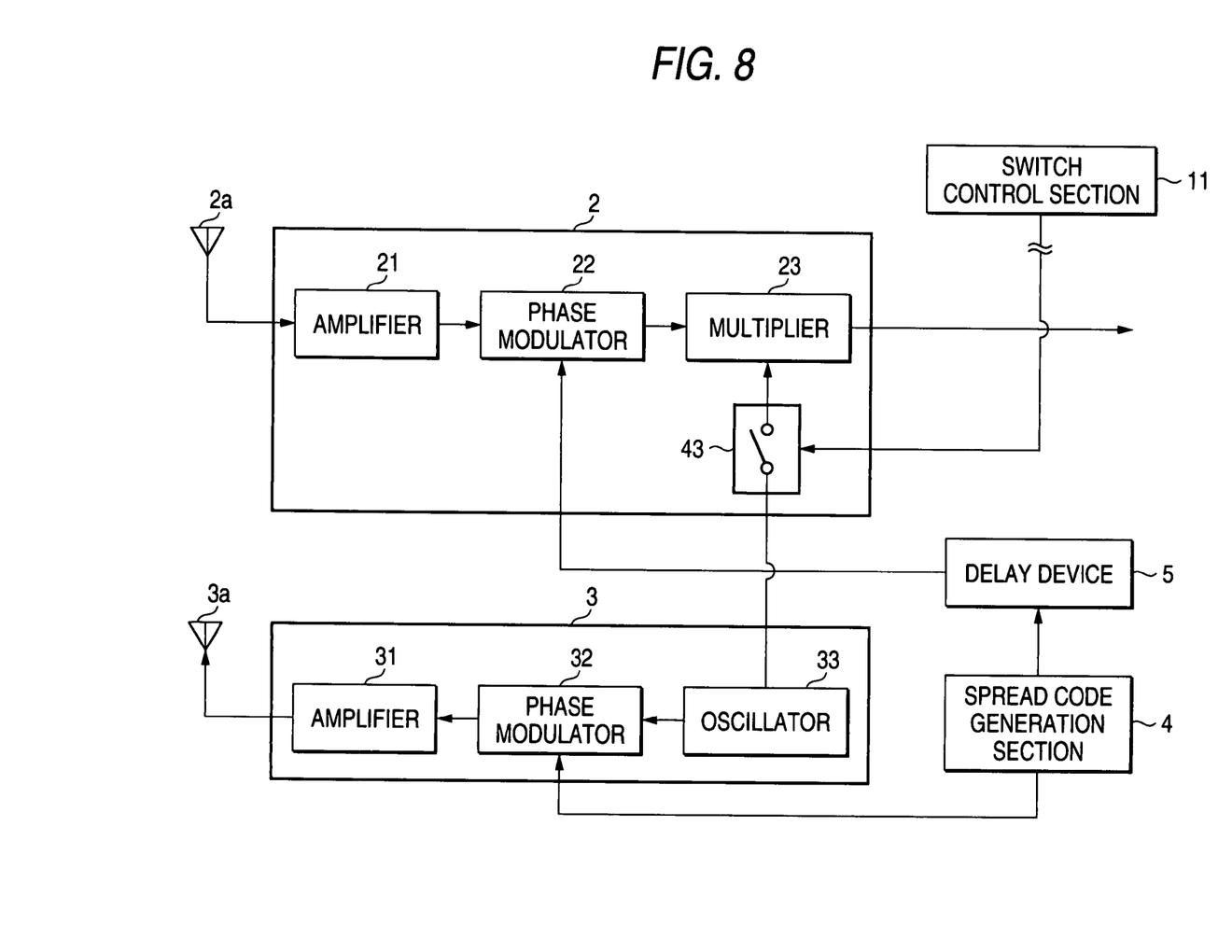
FIG. 8 is an explanatory diagram explaining a configuration for adding the switching frequency to the detection signal by switching a supply state of a high frequency signal.

Also, FIG. 8 is an explanatory diagram explaining a configuration for disposing a switch 43 between the oscillator 33 of the transmission section 3 and the multiplier 23 of the reception section 2 and for adding the switching frequency to the detection signal by switching a supply state of a high frequency signal. As shown in FIG. 8, the switch 43 is disposed between the oscillator 33 and the multiplier 23. This switch 43 receives control of the switch control section 11, and operates in accordance with the switching frequency. Switching the supply state of the high frequency signal can also add the switching frequency to the detection signal as with the radar apparatus 1 shown in FIG. 2.

Figure 9:
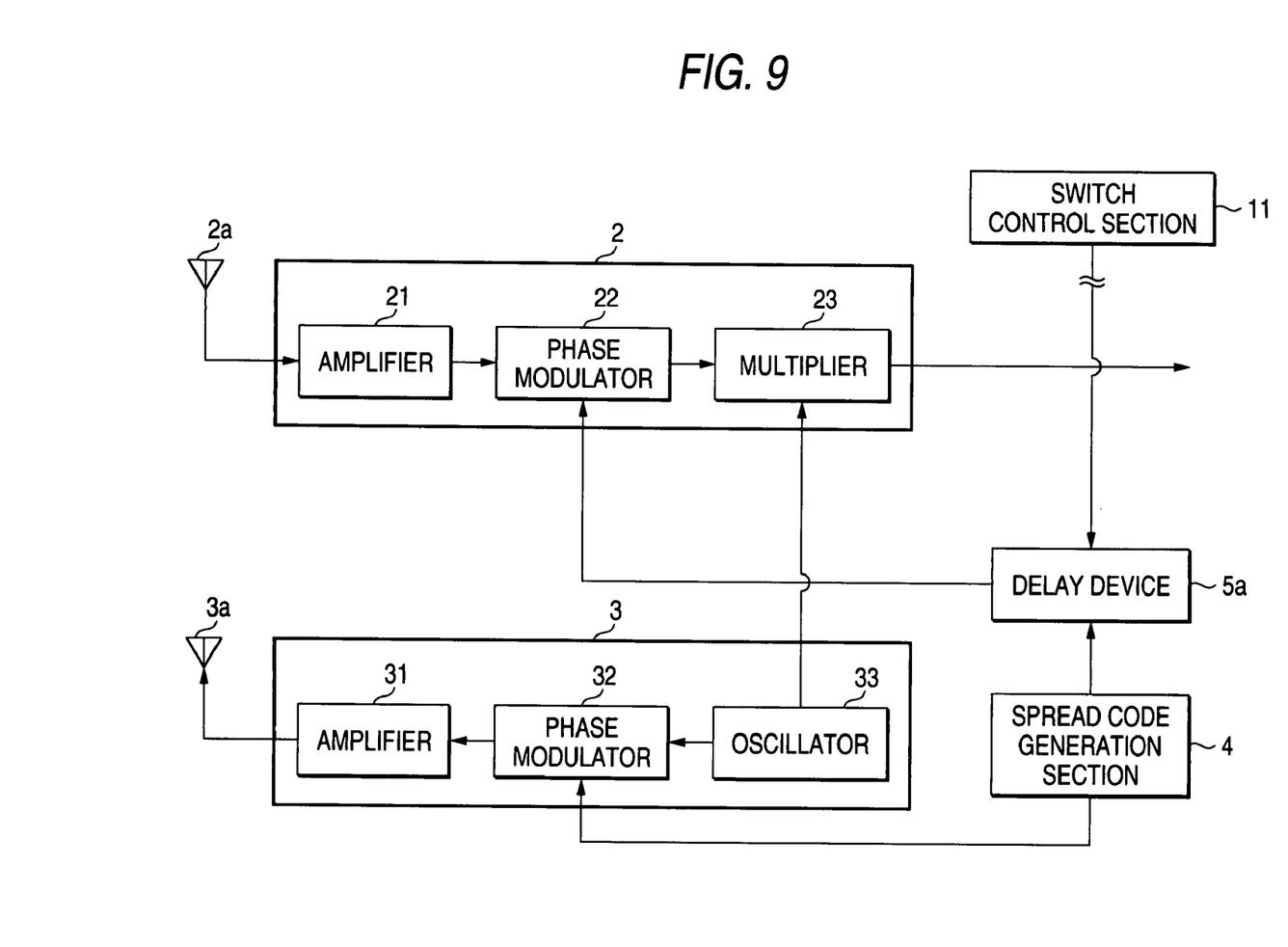
FIG. 9 is an explanatory diagram explaining a configuration for adding the switching frequency to the detection signal by switching a delay amount to a spread code.

Further, FIG. 9 is an explanatory diagram explaining a configuration for adding the switching frequency to the detection signal by switching a delay amount for a spread code. As shown in FIG. 9, a delay device 5a receives control of the switch control section 11, and changes a delay amount on the basis of the switching frequency. Switching an operation of the delay device 5a can also add the switching frequency to the detection signal as with the radar apparatus 1 shown in FIG. 2.

Figure 10:
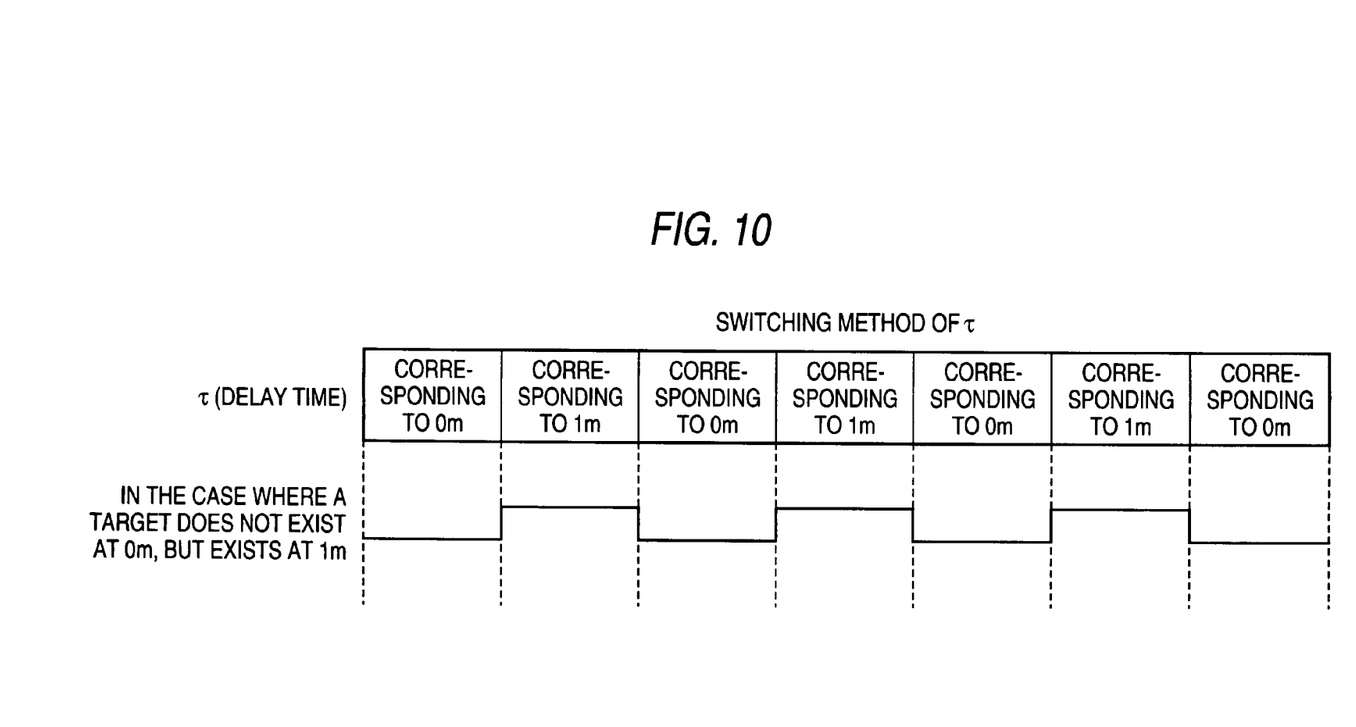
FIG. 10 is an explanatory diagram explaining a switching method of a delay amount.

Here, a specific example of a switching method of the delay amount (τ) will be further described. FIG. 10 is an explanatory diagram explaining as to the switching method of the delay amount. In FIG. 10, a delay amount being comparable to a distance to be detected (here, 1 m) and a delay amount being comparable to a distance where an object to be detected (target) should not exist (e.g., 0 m) are switched alternately.

When an object (target) exists at a distance to be detected, an output value of the detection signal becomes high due to the reflected wave. When there is no object to be detected, the output value of the detection signal becomes low. Therefore, by switching the delay amount, i.e., switching a distance to be detected on the basis of the switching frequency, a detection signal having a component at the switching frequency is output.

On the other hand, in the case where the object does not exist at a distance to be detected, even if the delay amount is switched, the output value of the detection signal is kept to be low, and a signal at the switching frequency is not obtained. In this regard, by switching the delay amount and detecting the switching frequency from the detection signal, it is possible to know presence or absence of the object (target) at the distance to be detected.

In the meantime, the switching frequency used to switch the delay amount may be changed in accordance with the distance to be detected. If the switching frequency is made to correspond to the distance (delay amount) to be detected, the distance to the target can easily found by detecting the switching frequency from the detection signal and obtaining the switching frequency.

Figure 11:
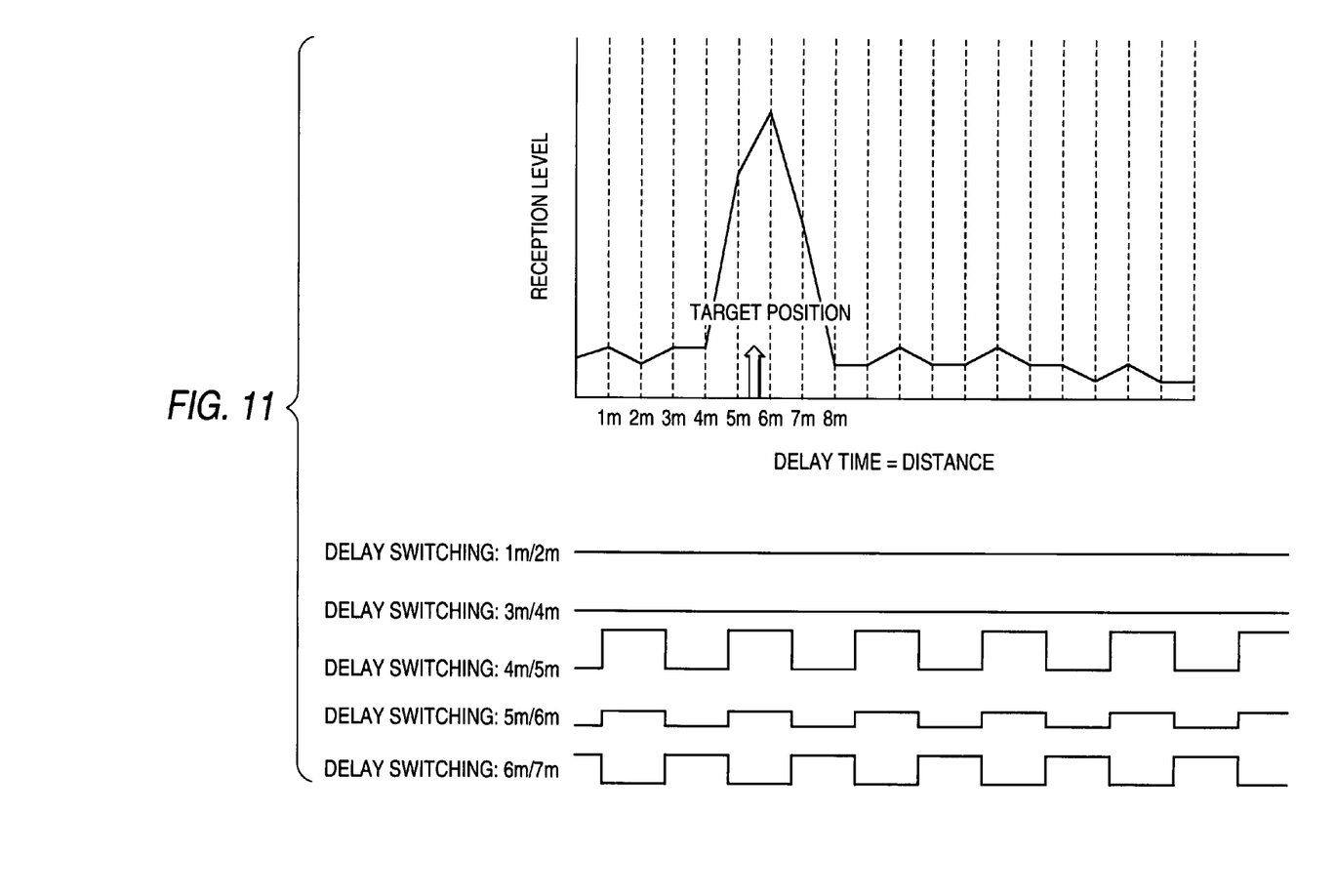
FIG. 11 is an explanatory diagram explaining a method for switching between a distance to be detected, and a neighboring distance, alternately.

Next, another specific example of a switching method of the delay amount (τ) will be described. For example, the distance to be detected and a neighboring distance may be changed alternately. FIG. 11 is an explanatory diagram explaining a method of alternately switching between the distance, which is tried to be detected, and the neighboring distance.

Here, the neighboring distance means a distance, which corresponds to resolution of distance detection and is adjacent to the distance to be detected. For example, if the distance to be detected is 5 m and the resolution is 1 m, a delay amount corresponding to 5 m and a delay amount corresponding to 6 m (or delay amount corresponding to 4 m) are switched alternately.

In the case of measuring a distance by use of a radar apparatus, there may be a chance that reception intensity of the reflected wave increases even in the vicinity of an actual distance. This is a cause of a measurement error. However, when an intensity level of the reflected wave is compared with the neighboring distance in this manner, it is possible to detect a distance where reception intensity reaches a peak and to improve measurement accuracy.

FIG. 11 shows a relation between delay time (measurement distance) and a reception level (reception intensity) of the reflected wave. FIG. 11 shows an intensity distribution example in which measurement was carried out with resolution of 1 m and a target exists in the vicinity of 6 m. In this intensity distribution, a reception intensity of the reflected wave increases in a range of 5-7 m.

In this state, when measurement is carried out while alternately switching between a delay amount corresponding to 1 m and a delay amount corresponding to 2 m, reception intensitys of the both are small. Therefore, the switching frequency is not detected in the detection signal. Similarly, when measurement is carried out while alternately switching between a delay amount corresponding to 3 m and a delay amount corresponding to 4 m, the switching frequency is not detected in the detection signal.

However, when measurement was carried out while alternately switching between a delay amount corresponding to 4 m and a delay amount corresponding to 5 m, reception intensity measured at a time of using the delay amount corresponding to 5 m becomes sufficiently large as compared with that measured at a time of using the delay amount corresponding to 4 m. Therefore, the switching frequency can be detected from the detection signal.

Similarly, when measurement is carried out while alternately switching between a delay amount corresponding to 5 m and a delay amount corresponding to 6 m, reception intensity measured at a time of using the delay amount corresponding to 6 m is further larger that that measured at a time of using the delay amount corresponding to 5 m. Therefore, the switching frequency can be detected from the detection signal, and a similar wave form to that in the case that 4 m and 5*m* are compared is detected.

Furthermore, when measurement is carried out while alternately switching a delay amount corresponding to 6 m and a delay amount corresponding to 7 m, reception intensity measured at a time of using the delay amount corresponding to 7 m is sufficiently small as compared with that measured at a time of using the delay amount corresponding to 6 m. Therefore, although the switching frequency is detected from the detection signal, a phase of its wave form is inverted as compared with those obtained when 4*m* and 5*m* are compared and when 5*m* and 6*m* are compared.

This phase inversion indicates that a peak of reflection intensity is exceeded. Therefore, by calculating a delay amount with which a peak of the reflection intensity, i.e., inversion of a phase is caused, it is possible to measure a distance to a target with high accuracy.

Figure 12:
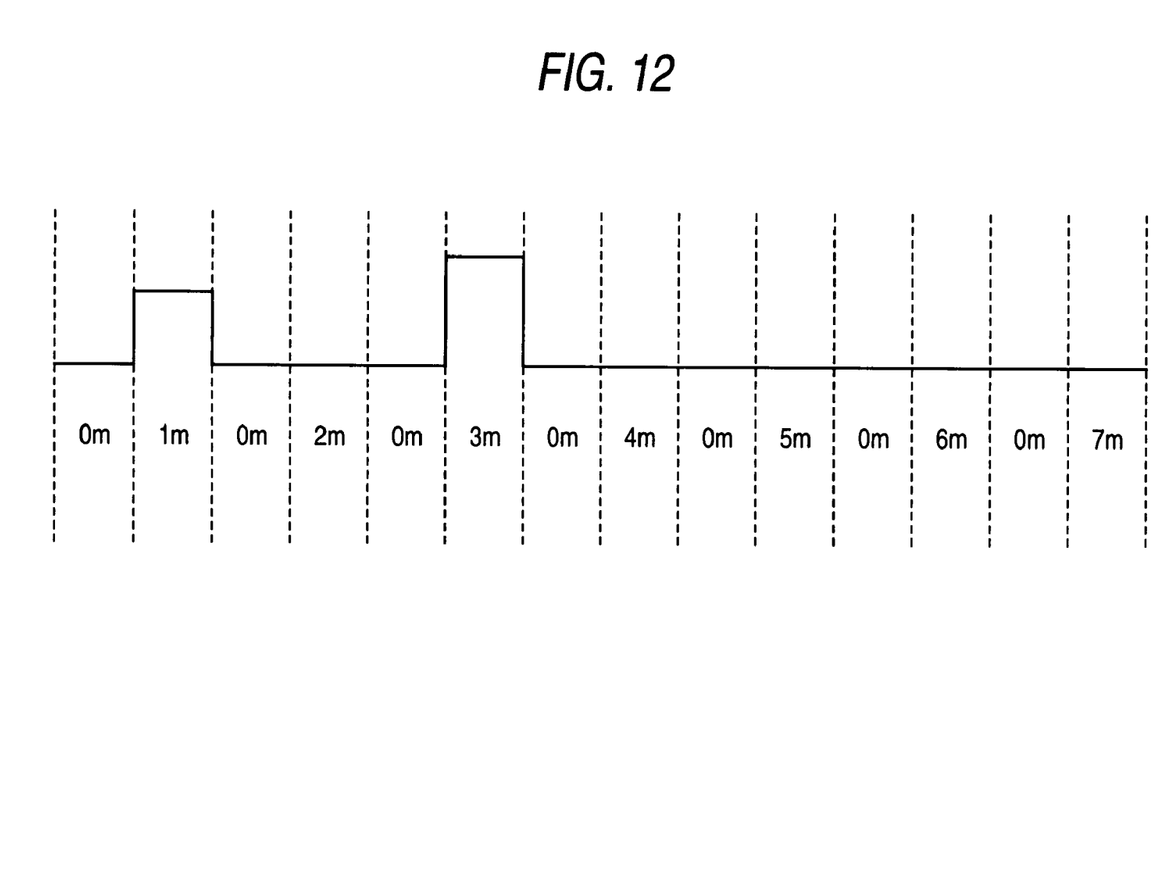
FIG. 12 is an explanatory diagram explaining a method for scanning over a predetermined range.

Further, as still another switching method of the delay amount (τ), for example, a distance to be detected and a neighboring distance may be switched alternately while a distance to be detected is changed to scan a predetermined range. FIG. 12 is an explanatory diagram explaining a method for scanning a predetermined range.

As shown in FIG. 12, by alternately switching between a distance where an object (target) to be detected should not exist (e.g., 0 m) and a distance to be detected while extending the distance to be detected in sequence, it is possible to carry out object detection in a wide range at short times.

In FIG. 12, the distance to be detected is extended in sequence, that is, 0 m, 1 m, 0 m, 2 m, 0 m, 3 m, 0 m, 4 m. As a result, increase of intensity of a detection wave is detected at 1 m and 3 m. Therefore, in this example, targets exist at 1 m and 3 m.

Also, as still another delay amount switching method, the following procedure may be employed. Frequency (chip rate) of the spread code is lowered and presence or absence of an object is detected with a large pitch, and thereafter, a chip rate of the spread code is increased to the vicinity of the detected distance so that distance measurement is carried out with high accuracy. In this method, it is possible to carry out high accuracy distance measurement at high speed.

Also, detection may be carried out with a predetermined chip rate at plurality times, to increase certainty of detection. A scale of a delay amount and frequency of changing to that delay amount may be made to correspond to each other. This is because, in a radar apparatus for use in a vehicle, an object existing in the vicinity of a vehicle has larger influence as compared with a faraway object, and there is a necessity to carry out a response thereto more quickly.

That is, detection of an object being close to the vehicle is important as compared with detection of a faraway object. There is a necessity to find such an object promptly. Therefore, detection is carried out on a preferential basis, by heightening detection frequency with a small delay amount as compared with detection frequency with a large delay amount.

In this manner, by changing frequency of switching to a delay amount in accordance with a distance to be detected (delay amount), it is possible to carry out weighted object detection/distance detection.

As described above, in this embodiment, the switch control section 11 switch controls the reception section 2, the transmission section 3, and/or the delay device 5 at a predetermined frequency to add an alternating current component of the switching frequency to a detection signal, and the switching frequency detection section 12 detects the switching frequency in the detection signal.

Accordingly, the above described embodiment provides a spread spectrum radar apparatus, which outputs alternating current signals with a simple configuration. Also, in case of detecting relative speed, switching is stopped and Doppler frequency of the detection signal is detected. Therefore, it is possible to measure relative speed as well as a relative distance.

Further, the detection signal is amplified and saturated, and output as a binary signal. Thereby, it is possible to input the detection signal to a digital signal processor without providing an analog/digital converter. That is, a configuration of the radar apparatus can be more simplified.

In this embodiment, the configuration of switching any one of the transmission side, the reception side and the delay device is described. It should be understood that a similar advantage can be obtained even when the transmission side, the reception side and the delay device are combined and switched at the same time.

As above, a radar apparatus according to the embodiment of the invention is useful for measurement of a relative distance, and in particular, suitable for a radar apparatus, which requires an AC signal output with a simple configuration.

What is claimed is:

1. A radar apparatus comprising:
 a transmission section that transmits a signal wave, which is spectrum spread with using a spread code;
 a delay device that gives delay to the spread code;
 a reception section that receives the transmission of the signal wave reflected by an object and spectrum despreads the reflected wave with using the delayed spread code to output a despread signal;
 a switch control section that generates a switching frequency and controls at least one of a gain of an amplifier provided in the transmission section, a gain of an amplifier provided in the reception section and an operation of the delay device based on the switching frequency;
 a switching frequency detection section that detects a switching frequency component from the despread signal that corresponds to the switching frequency received from the switch control section; and
 a relative distance calculation section that calculates a distance between the radar apparatus and the object based on a detection result provided by the switching frequency detection section and an amount of the delay given by the delay device.

2. The radar apparatus according to claim 1, wherein:
 at least one of the transmission section and the reception section includes a switch; and
 the switch control section controls the switch to switch at the switching frequency.

3. The radar apparatus according to claim 1, wherein:
 at least one of the transmission section and the reception section includes an amplifier for amplifying at least one of the transmission wave and the reflected wave; and
 the switch control section controls gain of the amplifier to switch at the switching frequency.

4. The radar apparatus according to claim 1, wherein:
 the transmission section includes a spread section that spectrum spreads the transmission wave with using the spread code; and
 the switch control section controls an operation of the spread section to switch at the switching frequency.

5. The radar apparatus according to claim 1, wherein:
 the reception section includes a despread section that spectrum despreads the reflected wave with using the delayed spread code; and
 the switch control section controls an operation of the despread section to switch at the switching frequency.

6. The radar apparatus according to claim 1, wherein the switching frequency is higher than a Doppler frequency, which is generated in the reflected wave when the object has a relative speed to the radar apparatus.

7. The radar apparatus according to claim 1, further comprising:
 a saturation amplifier that amplifies the despread signal so that the amplified despread signal saturates, to output a binary signal.

8. The radar apparatus according to claim 7, wherein:
 the saturation amplifier includes a variable amplifier that amplifies the despread signal at a gain corresponding to the amount of the delay.

9. The radar apparatus according to claim 1, further comprising:
 a Doppler frequency detection section that detects a Doppler frequency from the despread signal while the switch control section stops switching.

10. The radar apparatus according to claim 1, wherein the switch control section controls the delay device to switch the amount of the delay.

11. The radar apparatus according to claim 10, wherein the switch control section changes the switching frequency in accordance with the amount of the delay.

12. A radar apparatus comprising:
 a transmission section that transmits a signal wave, which is spectrum spread using a spread code;
 a delay device that gives delay to the spread code;
 a reception section that receives the transmission of the signal wave reflected by an object and spectrum despreads the reflected wave using the delayed spread code to output a despread signal;
 a switch control section that generates a switching frequency at which an operation of at least one of the transmission section, the reception section, and the delay device is switched ON/OFF;
 a switching frequency detection section that detects a switching frequency component from the despread signal that corresponds to the switching frequency received from the switch control section; and
 a relative distance calculation section that calculates a distance between the radar apparatus and the object based on a detection result provided by the switching frequency detection section and an amount of the delay given by the delay device,
 wherein the switch control section controls the delay device to switch the amount of the delay, and wherein when the delay device switches the amount of the delay, the switch control section controls the delay device so that the amount of the delay corresponds to a frequency of switching to the amount of the delay.

13. The radar apparatus according to claim 1, wherein the relative distance calculation section sets the amount of the delay in the delay device.

14. A radar apparatus comprising:
a transmission section that transmits a signal wave, which is spectrum spread using a spread code;
a delay device that gives delay to the spread code;
a reception section that receives the transmission of the signal wave reflected by an object and spectrum despreads the reflected wave using the delayed spread code to output a despread signal;
a switch control section that generates a switching frequency at which an operation of at least one of the transmission section, the reception section, and the delay device is switched ON/OFF;
a switching frequency detection section that detects a switching frequency component from the despread signal that corresponds to the switching frequency received from the switch control section; and
a relative distance calculation section that calculates a distance between the radar apparatus and the object based on a detection result provided by the switching frequency detection section and an amount of the delay given by the delay device,
wherein the relative distance calculation section sets the amount of the delay in the delay device, and
wherein when the detection result indicates that the switching frequency is not detected from the despread signal, the relative distance calculation section changes the amount of the delay set in the delay device.

15. A radar apparatus for transmitting a spread spectrum signal wave with using a spread code, despreading a reflected wave using the spread code, and calculating a distance from an amount of the delay, the radar apparatus comprising:
a delay device that gives a delay to the spread code;
a reception section that receives the transmission of the signal wave reflected by an object and spectrum despreads the reflected wave using the delayed spread code to output a despread signal;
a switch control section that generates a switching frequency and controls at least one of a gain of an amplifier provided in a transmission section, a gain of an amplifier provided in the reception section and an operation of the delay device based on the switching frequency;
a switching frequency detection section that detects a switching frequency component from the reflected wave received by the reception section that corresponds to the switching frequency received from the switch control section; and
a relative distance calculation section that calculates a distance between the radar apparatus and the object based on a detection result provided by the switching frequency detection section and an amount of the delay given by the delay device.

16. The radar apparatus according to claim 15, wherein:
at least one of the transmission section and the reception section includes a high-frequency switch; and
the switch control section conducts switch-control of the high-frequency switch.

17. The radar apparatus according to claim 15, wherein:
at least one of the transmission section and the reception section includes a amplification section that amplifies the signal wave or the reflected wave; and
the switch control section controls the gain of the amplification section to switch at the switching frequency.

18. The radar apparatus according to claim 15, wherein the switch control section switches an operation of at least one of (a) a spread section that is disposed inside the transmission section and conducts the spectrum spread and (b) a despread section that is disposed inside the reception section and conducts the spectrum despread.

19. The radar apparatus according to claim 15, wherein when an object to be calculated the distance has a relative speed, the switch control section conduct the switching at higher frequency than a Doppler frequency caused in the reflected wave due to the relative speed.

20. The radar apparatus according to claim 15, further comprising:
a saturation amplification section that amplifies a detection signal generated by despreading the reflected wave so that the amplified detection signal saturates, to output a binary signal.

21. The radar apparatus according to claim 1, wherein:
the switch control section generates the switching frequency at which an operation of at least one of the transmission section, the reception section, and the delay device is switched ON/OFF.

22. The radar apparatus according to claim 15, wherein:
the switch control section generates the switching frequency at which an operation of at least one of (a) a transmission section that transmits the signal wave, (b) a reception section that receives the reflected wave, and (c) a delay device that gives the delay to the spread code is switched ON/OFF.

* * * * *